United States Patent
Kodama

[11] Patent Number: 5,720,883
[45] Date of Patent: Feb. 24, 1998

[54] BISMUTH LEAD COMPOUND

[75] Inventor: Hiroshi Kodama, Tsuchiura, Japan

[73] Assignee: National Institute for Research in Inorganic Materials, Tsukuba, Japan

[21] Appl. No.: 593,808

[22] Filed: Jan. 30, 1996

[30] Foreign Application Priority Data

Jun. 6, 1995 [JP] Japan ................................. 7-162802

[51] Int. Cl.$^6$ .............................. C01B 21/48; C02F 1/42
[52] U.S. Cl. .......................... 210/683; 252/184; 423/395
[58] Field of Search ........................... 210/683; 423/395; 252/184

[56] References Cited

U.S. PATENT DOCUMENTS

| 2,157,511 | 5/1939 | Urbain et al. | 423/395 |
| 2,208,173 | 7/1940 | Urbain et al. | 423/395 |

FOREIGN PATENT DOCUMENTS

| 4125627 | 2/1993 | Germany | 210/683 |
| 32616 | 2/1994 | Japan | 423/395 |

OTHER PUBLICATIONS

Journal of Electrochemical Society, vol. 137, No. 10, pp. 3071–3078, Oct. 1990, Larry A. Larew, et al., "Electrocatalysis of Anodic Oxygen–Transfer Reactions".

Chemical Abstracts, vol. 80, No. 12, AN 61587y, Mar. 25, 1974.

Database WPI, Derwent Publications, AN 89–019746, JP-A-63 295 682, Dec. 2, 1988.

Patent Abstracts of Japan, vol. 18, No. 248 (C–1198), May 12, 1994, JP-A-06 032616, Feb. 8, 1994.

Patent Abstracts of Japan, vol. 18, No. 198 (C–1187), Apr. 7, 1994, JP-A-06 001614, Jan. 11, 1994.

*Primary Examiner*—Wayne Langel
*Attorney, Agent, or Firm*—Oblon, Spivak, McClelland, Maier & Neustadt, P.C.

[57] ABSTRACT

A bismuth lead compound of the formula $BiPbO_2(NO_3)$.

14 Claims, 9 Drawing Sheets

BISMUTH LEAD COMPOUND

The present invention relates to a novel bismuth lead compound containing a ($NO_3$) group and a method for its production as well as an inorganic anion exchanger and a method for removing inorganic anions, wherein the novel compound is utilized. More particularly, the present invention relates to a novel bismuth lead compound useful for removal of inorganic anions such as chloride ions or iodide ions from an aqueous solution or an organic solvent, for treatment of industrial waste waters, for removal or fixing radioactive ions from waste water from an atomic power plant, or for recovery and removal of ionic components in a gas, and a process for its production as well as an inorganic anion exchanger and a method for fixing or removing inorganic anions, as its applications.

Removal of inorganic anions such as chloride ions and iodide ions has heretofore been an important subject in various industrial fields such as chemical industry, food industry, industrial waste liquid treatment and waste liquid treatment at atomic power plants. Ion exchangers have been developed as treating agents for such purposes. Further, it is particularly desired to store radioactive chloride ions or radioactive iodide ions in the form of a stable fixed body.

As such ion exchangers, organic ion exchangers have heretofore been mainly employed. However, organic ion exchangers have had a relatively low exchange performance against inorganic anions, and they have had a problem in their stability when they are used as agents for removal of inorganic anions or as agents for fixing and removing radioactive inorganic anions.

Accordingly, an attention has been drawn to inorganic ion exchangers as agents for removing or fixing inorganic anions. However, inorganic anion exchangers so far known are poor in acid resistance, alkali resistance and heat resistance. Accordingly, there has been a problem in their stability in the use of such inorganic anion exchangers. Besides, they have had drawbacks such that they require many complicated pretreatments, and they lack in general applicability.

Further, with respect to the conventional inorganic anion exchangers, a drawback has been pointed out that their ion exchange capacities and ion exchange rates are generally low, whereby it has been practically impossible to carry out effective ion exchange.

The present invention has been made in view of these circumstances. It is an object of the present invention to overcome the drawbacks of conventional inorganic ion exchangers and to provide a new material system useful as e.g. an inorganic anion exchanger which is excellent in the acid resistance, alkali resistance and heat resistance and which has a large ion exchange capacity and a high ion exchange rate, and a method for its production as well as a method of its use as an ion exchanger or an ion-fixing agent.

To accomplish the above objects, the present invention provides a bismuth lead compound of the formula $BiPbO_2$($NO_3$) and a method for its production as well as its applications.

Namely, the present invention provides, in addition to the above compound, a method for producing the bismuth lead compound, which comprises heating and reacting a starting material mixture prepared so that the molar ratio of a bismuth element, a lead element, an oxygen element and a nitrate group ($NO_3$) becomes about 1:1:2:1, with or without addition of water.

Further, the present invention provides an inorganic ion exchanger comprising the above bismuth lead compound as an effective component, and a method for removing or fixing inorganic anions such as chloride ions or iodide ions by means of such a compound or an inorganic exchanger.

Figure 1:
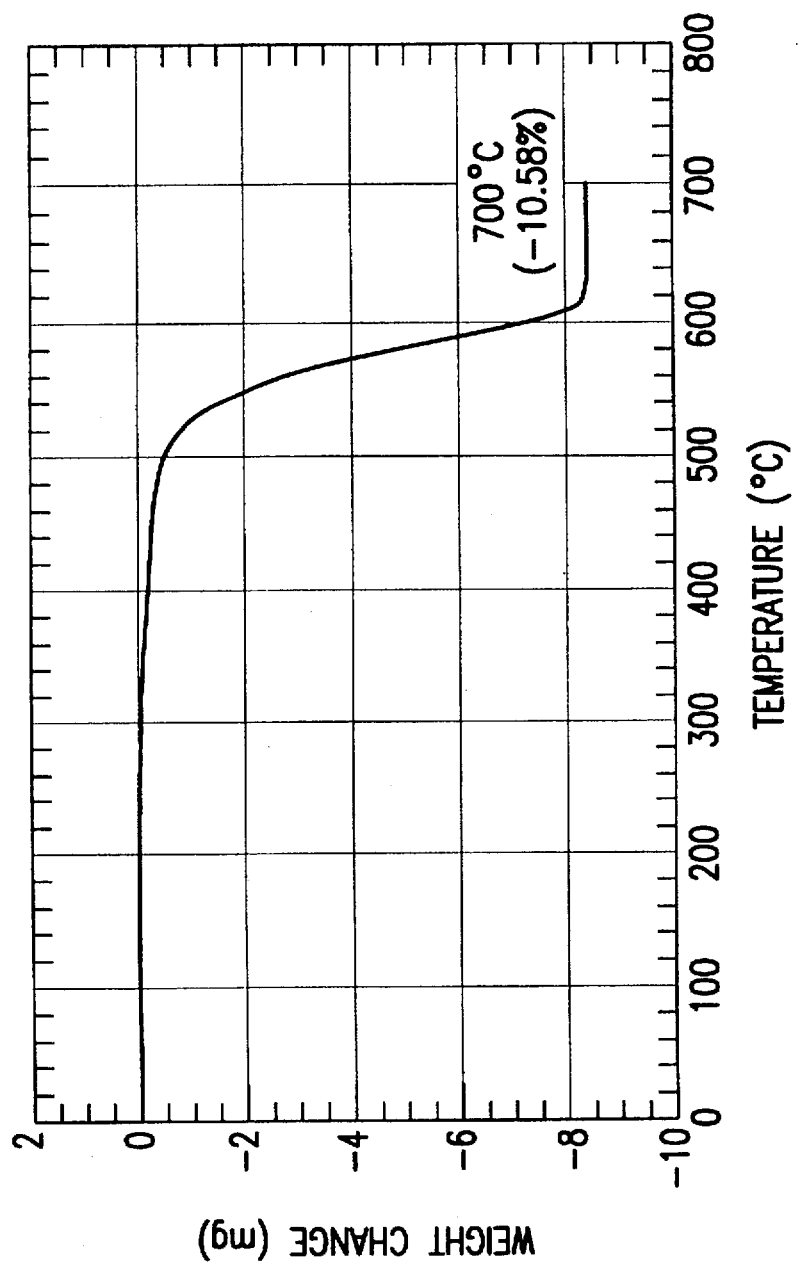
FIG. 1 is a graph showing the thermogravimetric curve of $BiPbO_2$($NO_3$).

Now, the present invention will be described in further detail with reference to the preferred embodiments.

Firstly, in the method of the present invention for producing the desired bismuth lead compound, suitable compounds such as bismuth oxide, lead oxide, bismuth nitrate and lead nitrate are used as raw materials. Among these compounds, necessary ones are used in combination as a starting material mixture. The composition of the starting material mixture is preferably adjusted so that the molar ratio of a bismuth element and a lead element becomes about 1:1, and the molar ratios of a bismuth element and an oxygen element, and a bismuth element and a nitrate group become about 1:2 and about 1:1, respectively. The proportions of the oxygen element and the nitrate group to the bismuth element may usually be larger than the above ratios, because excess oxygen or nitrate group will eventually be discharged and thus will not affect the composition of the product.

The chemical reactions for the formulation of $BiPbO_2$($NO_3$) from the starting material may be represented, for example, by the following formulas.

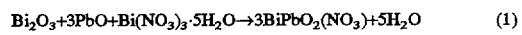

$Bi_2O_3 + 3PbO + Bi(NO_3)_3 \cdot 5H_2O \rightarrow 3BiPbO_2(NO_3) + 5H_2O$ (1)

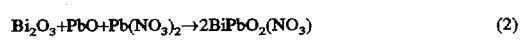

$Bi_2O_3 + PbO + Pb(NO_3)_2 \rightarrow 2BiPbO_2(NO_3)$ (2)

Reactions (1) and (2) do not proceed at temperatures around room temperature. Reaction (1) is usually conducted by heating preferably at a temperature of at least 200° C., and reaction (2) is usually conducted by heating preferably at a temperature of at least 300° C. Further, by an addition of water to the powder starting material at the time of the reaction, the reaction initiating temperature can be lowered.

For example, when reaction (2) is conducted in a state where water is added to the starting material, pure $BiPbO_2(NO_3)$ can be obtained even at a temperature of 250° C.

If these reactions are carried out in an opened container, a part of $NO_3$ is likely to be discharged to the atmosphere without being reacted, or added water is likely to be discharged in the atmosphere, whereby the yield of the desired compound decreases. Therefore, it is advisable to use a closed container. However, if the synthesis by the above chemical reactions is carried out in a closed container, coexisting water or an unreacted nitrate group will be present as a gas component, whereby the pressure in the closed container will be higher than the atmospheric pressure. Therefore, it is preferred to use a pressure resistant container as the closed container, or to use the closed container as accommodated in a pressure container.

The compound of the formula $BiPbO_2(NO_3)$ of the present invention is useful as an inorganic anion exchanger. It is thereby possible to effectively remove inorganic anions such as halide ions such as chloride ions or iodide ions, and yet to convert such anions to a stable fixed body. The ion exchange property is effective in an acidic, neutral or alkaline aqueous solution.

Some bismuth oxide nitrate type compounds are known to exhibit ion exchange properties against halogen ions. It has been made clear that such compounds perform ion exchange with halogen ions by the hydroxyl groups or nitrate groups contained in their compositions. The bismuth lead compound of the present invention also has a nitrate group in its composition, and it has been confirmed that this nitrate group performs ion exchange with a chloride ion or an iodide ion. In the case of the present invention, excellent ion exchange properties which can not be expected from the prior art, have been realized.

The ion exchanger consisting of the compound of the present invention is expected to be useful not only as an ion exchanger for halide ions but also as exchangers for various inorganic anions and as agents for fixing and removing such inorganic anions.

It may be used in various forms as the ion exchanger. The form may be suitably selected depending upon the particular use, for example, from a granular form, a powder form and a porous product thereof bound by a binder.

Now, the bismuth lead compound of the present invention and the method for its production as well a the inorganic anion exchanger employing it will be described in further detail with reference to Examples. However, it should be understood that the present invention is by no means restricted by such Examples.

EXAMPLE 1

A powder sample prepared by mixing PbO, $Bi_2O_3$ and $Bi(NO_3)_3 \cdot 5H_2O$ in a molar ratio of 3:1:1, was used as the starting material. About 0.2 g of this starting material was put into a platinum capsule and sealed. Then, this capsule was put into a pressure container and then heated for 24 hours in an electric furnace which was preliminarily heated to a predetermined temperature. During the heating, the inside of the pressure container was pressurized to a level of from about 100 to 1000 kg/cm², to prevent breakage of the capsule due to an increase of the internal pressure of the platinum capsule by a gas component discharged upon decomposition. After heating, the sample was rapidly cooled, taken out and subjected to the analysis of the composition and the analysis of the structure.

Figure 2:
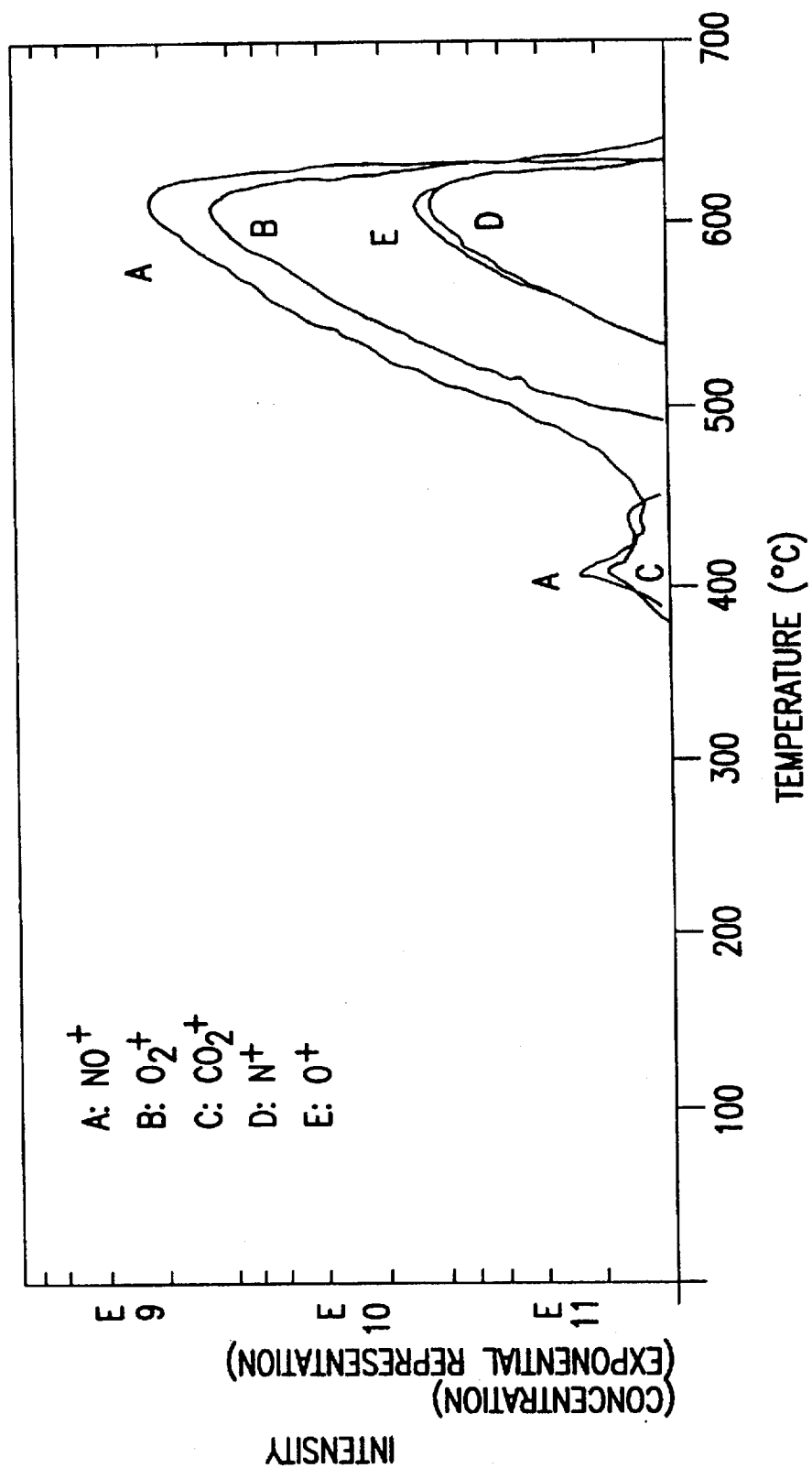
FIG. 2 is a graph showing mass spectrometric curves, wherein A represents a curve showing the partial pressure of NO, B represents a curve showing the partial pressure of $0_2$, C represents a curve showing the partial pressure of $CO_2$, D represents a curve showing the partial pressure of N, and E represents a curve showing the partial pressure of O.

The analysis of the composition of the product was carried out by a method wherein the thermogravimetric analysis and the mass spectrometry were used in combination. If $BiPbO_2(NO_3)$ is heated to a high temperature, it eventually decomposes. The mode of decomposition was examined by means of a thermobalance, and the results are shown in FIG. 1. As is evident from this FIG. 1, the decomposition started at about 450° C. and completed at about 600° C., whereby the weight of the sample decreased by 10.58%. The gas components discharged at the time of the decomposition were examined by the simultaneous observation by means of a mass spectrometer. The results are shown in FIG. 2. The main components discharged by the decomposition are NO, $O_2$, O and N, which are decomposition products of $NO_3$. In addition, a small amount of $CO_2$ was discharged as an impurity, but the amount was very small and negligible, as is apparent from FIG. 2. Thus, the reaction at the time of the thermal decomposition of $BiPbO_2(NO_3)$ may be represented as follows.

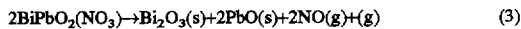

$$2BiPbO_2(NO_3) \rightarrow Bi_2O_3(s) + 2PbO(s) + 2NO(g) + (g) \qquad (3)$$

In this reaction formula, (s) indicates solid, and (g) indicates gas. NO is further decomposed and reacted to form $O_2$ or N. Accordingly, if the thermal decomposition is carried out in accordance with the formula (3), the weight reduction of the sample is calculated to be 10.59%. This value very well agrees to 10.58% of the value found by the test shown in FIG. 1. This indicates that the composition of the product is $BiPbO_2(NO_3)$, and this product was decomposed in accordance with the formula (3).

From the results of the foregoing thermogravimetric analysis and the mass spectrometry, the composition of the product of the present invention was confirmed to be $BiPbO_2(NO_3)$.

The structural analysis of this compound $BiPbO_2(NO_3)$ was carried out by the analysis of the X-ray diffraction pattern of the powder sample thereof.

Figure 3A:
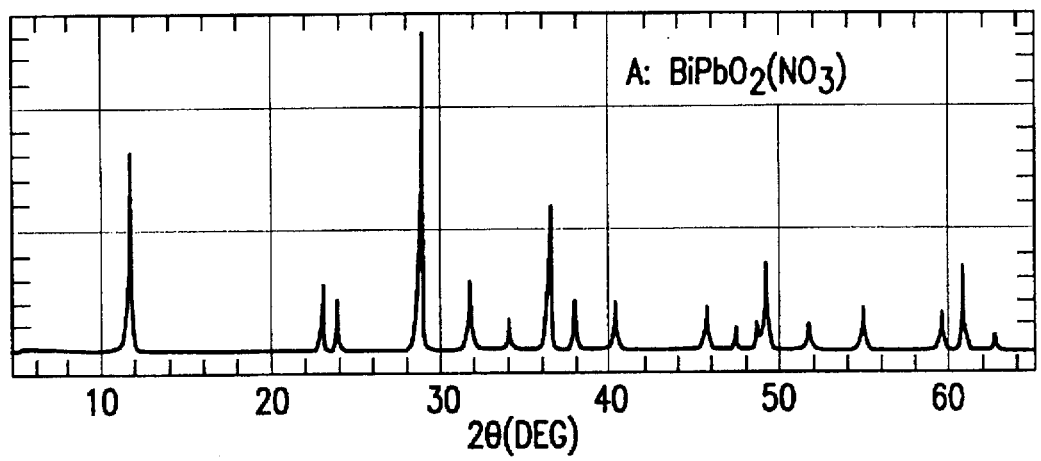
FIG. 3 is graph showing powder X-ray diffraction patterns, wherein C represents a case of compound $Bi_2O_2$($CO_3$), B represents a case of compound $BiPbO_2I$, and A represents a case of compound $BiPbO_2$($NO_3$).
Figure 3B:
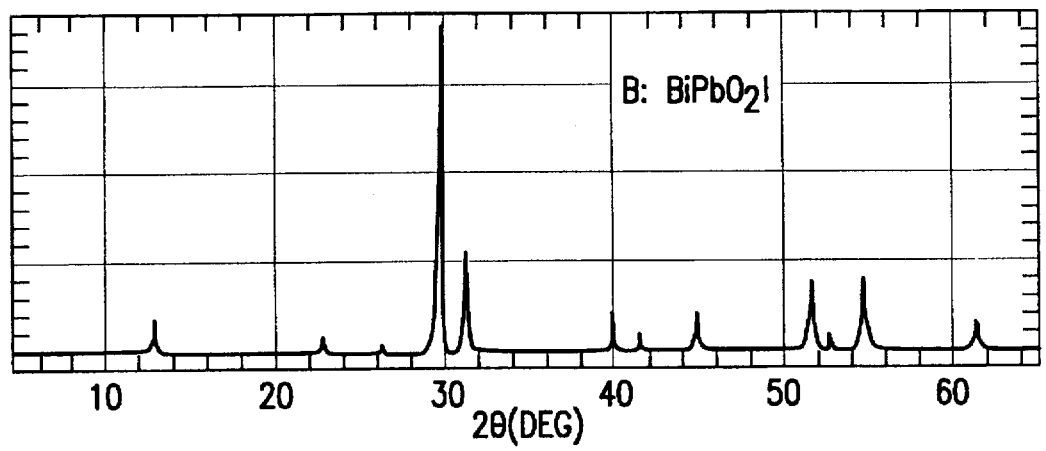
Figure 3C:
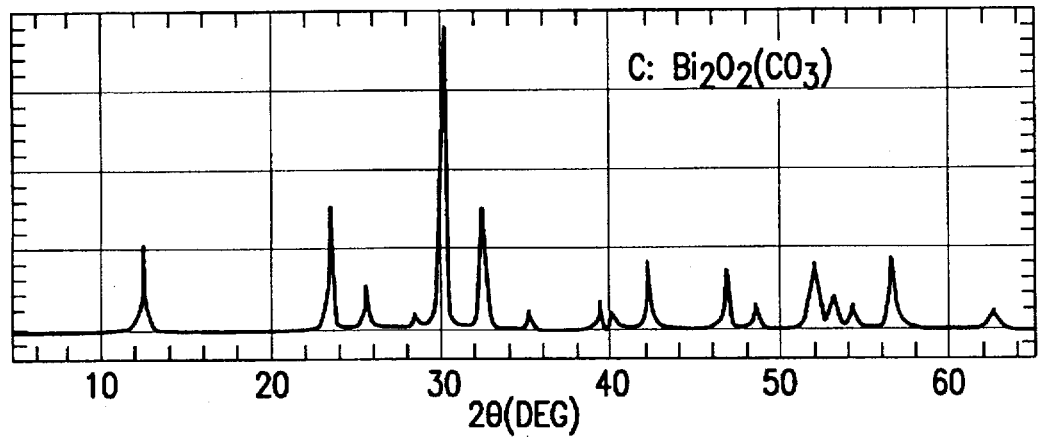

The X-ray diffraction patterns of powder samples of compounds $Bi_2O_2(CO_3)$ and $BiPbO_2I$ and compound $BiPbO_2(NO_3)$ prepared by the method of the present invention, were shown by A, B and C, respectively, in FIG. 3. From the comparison of these patterns, A, B and C are found to be similar patterns. Further, pattern A of compound $BiPbO_2(NO_3)$ and pattern (C) of compound $Bi_2O_2(CO_3)$ resemble each other particularly well. This indicates that the structures of these two compounds are basically the same.

The structure of compound $Bi_2O_2(CO_3)$ has previously been made clear. Namely, it has been reported that this compound has a tetragonal system structure, and the lattice constants are a=3.867 and c=13.686. In this invention, the structural analysis was carried out on the basis that compound $BiPbO_2(NO_3)$ has a tetragonal system structure. As a result, the lattice constants of $BiPbO_2(NO_3)$ were analyzed to be a=3.9710 and c=14.8189. Further, with respect to all peaks, the indices of plane (h k l), the calculated value ($d_1$) and the measured value ($d_2$) of the spacing (dÅ), and the measured value ($I_2$) of the relative reflection intensity (I%) of each X-ray peak were obtained. The results are shown in Table 1.

All peaks were properly indexed, and the respective calculated values and measured values agree very well. This indicates that the results of the structural analysis are correct. From these results and the above-mentioned results of the analysis of the composition, it can be concluded that the synthesized compound is a single phase having a composition of $BiPbO_2(NO_3)$.

TABLE 1

| (h k l) | $d_1$ (Å) | $d_2$ (Å) | $I_2$ (%) |
|---|---|---|---|
| 0 0 2 | 7.4095 | 7.4122 | 60 |
| 1 0 1 | 3.8357 | 3.8373 | 20 |
| 0 0 4 | 3.7047 | 3.7018 | 5 |
| 1 0 3 | 3.0949 | 3.0942 | 100 |
| 1 1 0 | 2.8079 | 2.8082 | 32 |
| 1 1 2 | 2.6257 | 2.6263 | 9 |
| 0 0 6 | 2.4698 | 2.4675 | 16 |
| 1 0 5 | 2.3752 | 2.3738 | 13 |
| 1 1 4 | 2.2378 | 2.2371 | 11 |
| 2 0 0 | 1.9855 | 1.9857 | 15 |
| 2 0 2 | 1.9178 | 1.9179 | 6 |
| 1 0 7 | 1.8681 | 1.8668 | 5 |
| 1 1 6 | 1.8545 | 1.8529 | 22 |
| 0 0 8 | 1.8524 | | |
| 2 1 1 | 1.7632 | 1.7631 | 7 |
| 2 0 4 | 1.7500 | 1.7493 | 3 |
| 2 1 3 | 1.6712 | 1.6710 | 24 |
| 2 0 6 | 1.5475 | 1.5462 | 10 |
| 1 1 8 | 1.5462 | | |
| 2 1 5 | 1.5234 | 1.5197 | 10 |
| 1 0 9 | 1.5210 | | |
| 0 0 10 | 1.4819 | 1.4803 | <1 |
| 2 2 0 | 1.4040 | 1.4039 | 4 |
| 2 2 2 | 1.3794 | 1.3789 | 2 |
| 2 1 7 | 1.3606 | 1.3598 | 2 |
| 2 0 8 | 1.3544 | 1.3538 | 1 |
| 3 0 1 | 1.3184 | 1.3187 | 1 |
| 2 2 4 | 1.3129 | 1.31211 | 1 |
| 1 1 10 | 1.3106 | 1.3094 | 1 |
| 3 0 3 | 1.2786 | 1.2783 | 4 |
| 1 0 11 | 1.2758 | 1.2752 | <1 |
| 3 1 0 | 1.2557 | 1.2556 | 4 |
| 3 1 2 | 1.2381 | 1.2379 | 1 |
| 0 0 12 | 1.2349 | 1.2337 | 1 |
| 2 2 6 | 1.2205 | 1.2202 | 3 |
| 3 0 5 | 1.2086 | 1.2068 | 7 |
| 2 1 9 | 1.2074 | | |
| 3 1 4 | 1.1898 | 1.1896 | 1 |
| 2 0 10 | 1.1876 | 1.1876 | <1 |
| 1 1 12 | 1.1304 | 1.1293 | 2 |
| 3 1 6 | 1.1194 | 1.1190 | 6 |
| 2 2 8 | 1.1189 | | |
| 3 2 1 | 1.0983 | 1.0983 | |
| 1 0 13 | 1.0957 | 1.0948 | <1 |

EXAMPLE 2

In Example 1, the reaction temperature was varied from 100° to 450° C., and the results are shown in Table 2. It is evident that in order to obtain pure $BiPbO_2(NO_3)$ by heating for 24 hours, the reaction is preferably conducted at a temperature of about 200° C. or higher.

TABLE 2

| Reaction temperature (°C.) | Reaction product |
|---|---|
| 100 | $BiPbO_2(NO_3)$ + Impurities |
| 150 | $BiPbO_2(NO_3)$ + Impurities |
| 200 | $BiPbO_2(NO_3)$ |
| 250 | $BiPbO_2(NO_3)$ |
| 350 | $BiPbO_2(NO_3)$ |
| 450 | $BiPbO_2(NO_3)$ |

The heating time required to form pure $BiPbO_2(NO_3)$ may be shorter than 24 hours. For example, when the starting material was taken out after heating at 350° C. for 2 hours, it was found that pure $BiPbO_2(NO_3)$ formed.

EXAMPLE 3

It was confirmed that substantially pure $BiPbO_2(NO_3)$ could be produced by prolonging the heating time beyond 24 hours even when the starting material disclosed in Example 1 was heated at a temperature of not higher than 200° C. Namely, using the same apparatus, method and starting material as used in Example 1, the reaction was carried out by heating at 150° C. for various periods of time, and the results are shown in Table 3. As is evident from Table 3, substantially pure $BiPbO_2(NO_3)$ can be obtained even at this temperature if heating is conducted for at least 6 days.

TABLE 3

| Reaction time (days) | Reaction product |
|---|---|
| 1 | $BiPbO_2(NO_3)$ + Impurities |
| 2 | $BiPbO_2(NO_3)$ + Impurities |
| 4 | $BiPbO_2(NO_3)$ + Impurities |
| 6 | $BiPbO_2(NO_3)$ |
| 8 | $BiPbO_2(NO_3)$ |
| 10 | $BiPbO_2(NO_3)$ |

EXAMPLE 4

A powder sample prepared by mixing PbO, $Bi_2O_3$ and $Pb(NO_3)_2$ in a molar ratio of 1:1:1 was used as the starting material. About 0.2 g of this starting material was put in a platinum capsule and sealed. Using the same apparatus and method as used in Example 1, the reaction was conducted by heating for 24 hours. After the heating, the sample was rapidly cooled, taken out and identified by the powder X-ray diffraction pattern.

The reaction temperature was varied from 100 to 450° C., and the results are shown in Table 4. It is apparent that in order to prepare pure $BiPbO_2(NO_3)$ by heating for 24 hours, the reaction is preferably conducted at a temperature of about 300° C. or higher.

TABLE 4

| Reaction temperature (°C.) | Reaction product |
|---|---|
| 100 | Unreacted |
| 150 | Unreacted |
| 200 | Impurities |
| 250 | Impurities |
| 300 | $BiPbO_2(NO_3)$ |
| 350 | $BiPbO_2(NO_3)$ |
| 450 | $BiPbO_2(NO_3)$ |

Also in this case, the heating time required to form pure $BiPbO_2(NO_3)$ may be shorter than 24 hours. For example, when the starting material was taken out after heating two hours at 350° C., it was found that pure $BiPbO_2(NO_3)$ formed.

EXAMPLE 5

To the starting material having the same composition and amount as used in Example 4, 0.2 ml of pure water was added, and the mixture was sealed in a platinum capsule. Using the same apparatus and method as used in Example 1, the reaction was conducted by heating at a temperature of 200°, 250° or 300° C. for 24 hours. After the heating, the sample was rapidly cooled and identified by the powder X-ray diffraction pattern. The results are shown in Table 5. As is evident from Table 5, in order to prepare pure $BiPbO_2(NO_3)$ by heating for 24 hours, the reaction is preferably conducted at a temperature of about 250° C. or higher. This temperature is lower by 50° C. than in Example 3. This is attributable to the fact that water was added to the starting material.

TABLE 5

| Reaction temperature (°C.) | Reaction product |
| --- | --- |
| 200 | $BiPbO_2(NO_3)$ + Impurities |
| 250 | $BiPbO_2(NO_3)$ |
| 300 | $BiPbO_2(NO_3)$ |

EXAMPLE 6

About 0.1 g (about $2 \times 10^{-4}$ g molecule) of compound $BiPbO_2(NO_3)$ and 1 ml of a 0.1 mol $dm^{-3}$ or 0.05 mol $dm^{-3}$ NaCl solution (adjusted to pH 1 with a $HNO_3$ solution) ($Cl^{-1}$: about $1 \times 10^{-4}$ g ion, or about $0.5 \times 10^{-4}$ g ion) were put into a container having a cover and reacted in a constant temperature vessel at 25° C. for various periods of time, whereby the progress of the reaction was examined. During the reaction, the container was shaked to stir the solution. Upon expiration of a predetermined time, the container was taken out, and the liquid and the solid were separated, whereupon the concentration of the chloride ions remaining in the solution was determined by ion chromatography.

Figure 4:
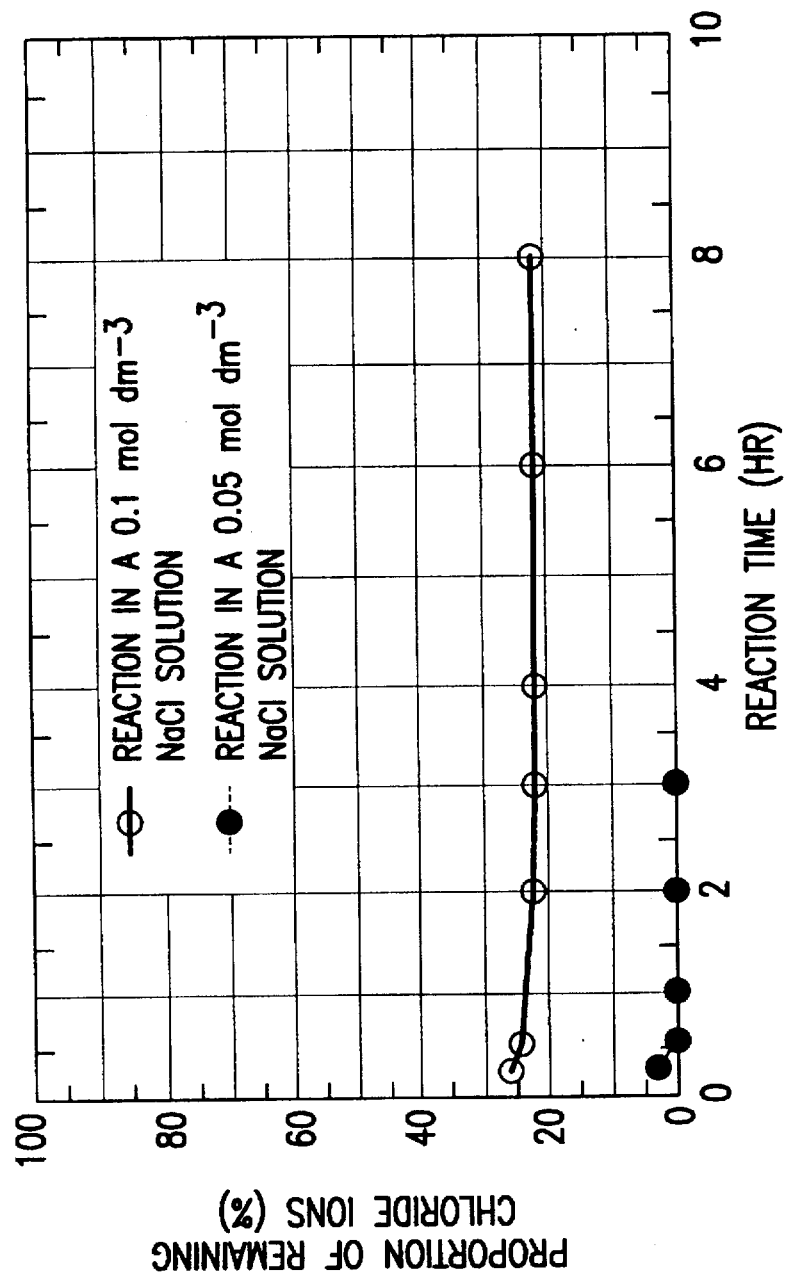
FIG. 4 is a graph showing the amount of chloride ions remaining in a solution of pH 1 at various times during the ion exchange reaction.

FIG. 4 of the attached drawings shows the relation between the reaction time and the proportion (%) of the remaining chloride ions. At either concentration, the reaction proceeded very quickly and the concentration of the remaining chloride ions reached a constant level within 80 minutes after the initiation of the reaction. The value was about 21% in the case of the reaction in the 0.1 mol $dm^{-3}$ NaCl solution, or about 0.3% in the case of the reaction in the 0.05 mol $dm^{-3}$ NaCl solution. The above results indicate that compound $BiPbO_2(NO_3)$ function stably and effectively as an inorganic anion exchanger even in a strongly acidic solution (pH=1).

EXAMPLE 7

About 0.1 g (about $2 \times 10^{-4}$ g molecule) of compound $BiPbO_2(NO_3)$ and 1 ml of a 0.1 mol $dm^{-3}$ or 0.05 mol $dm^{-3}$ NaCl solution (adjusted to pH 13 with NaOH solution) (Cl: about $1 \times 10^{-4}$ g ion or about $0.5 \times 10^{-4}$ g ion) were put into a container having a cover and reacted in a constant temperature vessel at a temperature of 25° C. for various periods of time to examine the progress of the reaction. During the reaction, the container was shaked to stir the solution. Upon expiration of a predetermined time, the container was taken out, and the liquid and the solid were separated, whereupon the concentration of the chloride ions remaining in the solution was determined by ion chromatography.

Figure 5:
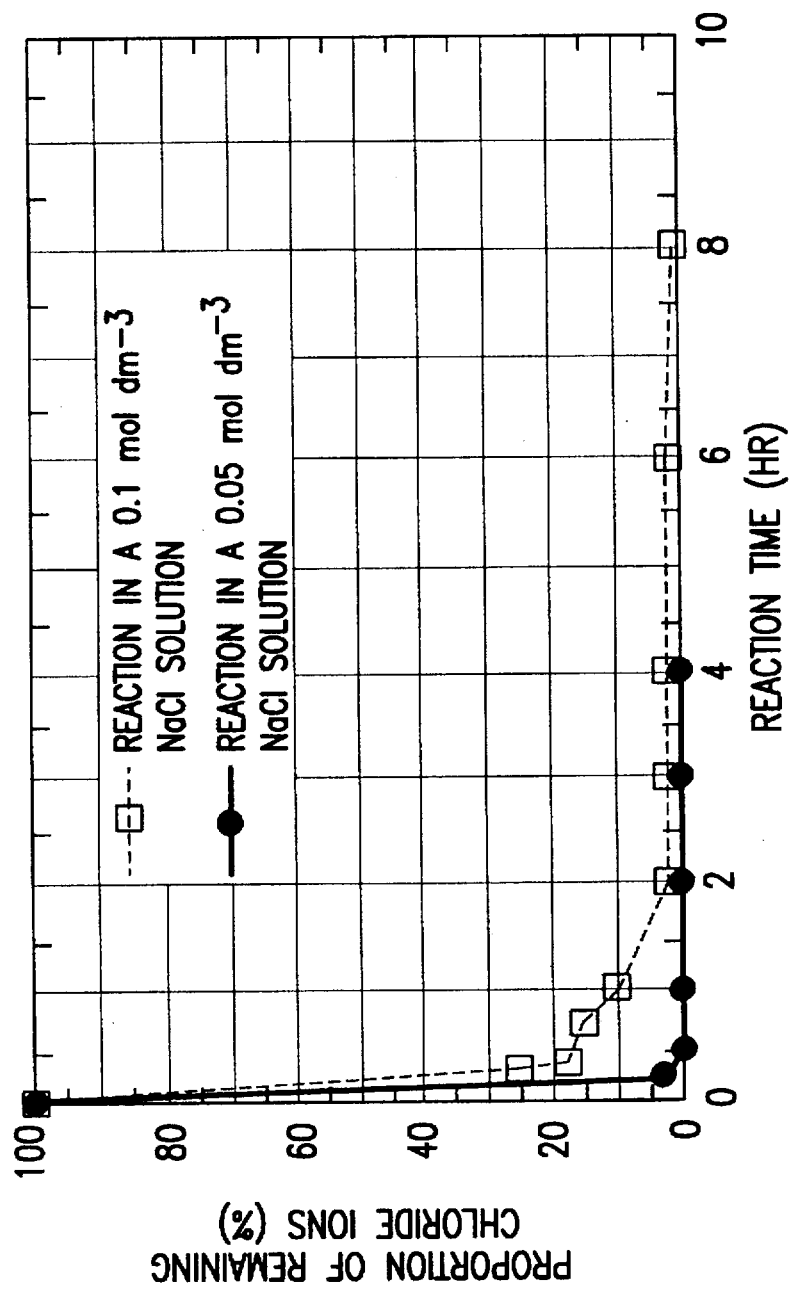
FIG. 5 is a graph showing the amount of chloride ions remaining in a solution of pH 13 at various times during the ion exchange reaction.

FIG. 5 of the attached drawings shows the relation between the reaction time and the proportion (%) of the remaining chloride ions. The reaction proceeded relatively quickly and substantially completed in about 3 hours from the initiation of the reaction in the case of the reaction in the 0.1 mol $dm^{-3}$ NaCl solution. The proportion of the remaining chloride ions at that time was about 2%. In the case of the reaction in the 0.05 mol $dm^{-3}$ NaCl solution, the reaction proceeded very quickly and substantially completed in about 30 minutes from the initiation of the reaction. The proportion of the remaining chloride ions at that time was about 1%.

The above results indicate that compound $BiPbO_2(NO_3)$ function stably and effectively as an inorganic anion exchanger even in a strongly alkaline solution (pH=13).

EXAMPLE 8

About 2.0 g (about $4 \times 10^{-3}$ g molecule) of compound $BiPbO_2(NO_3)$ and 10 ml of a 0.05 mol $dm^{-3}$ NaCl solution (adjusted to pH 1 or pH 13) ($Cl^{-1}$: about $5 \times 10^{-4}$ g ion), or about 2.0 g (about $4 \times 10^{-3}$ g molecule) of compound $BiPbO_2(NO_3)$ and 10 ml of a 0.005 mol $dm^{-3}$ NaCl solution (adjusted to pH 1 or pH 13) (Cl: about $5 \times 10^{-5}$ g ion), were put in a container having a cover and sealed, and then reacted in a constant temperature vessel at 25° C. for 24 hours while stirring the container. In this Example, the proportion of the ion exchanger to the chloride ions was made larger than in Examples 1 and 2. Further, the concentration of chloride ions was also varied.

The results are shown in Table 6. As is evident from this Table 6, the chloride ions were effectively removed in either one of the solutions having pH 1 and pH 13.

TABLE 6

| $Cl^-$ concentration before the reaction (mol $dm^{-3}$) | $Cl^-$ concentration after the reaction (mol $dm^{-3}$) | |
| --- | --- | --- |
| | Solution of pH 1 | Solution of pH 13 |
| $5 \times 10^{-2}$ (1773 ppm) | $7.61 \times 10^{-5}$ (2.69 ppm) | $6.09 \times 10^{-5}$ (2.15 ppm) |
| $5 \times 10^{-3}$ (177.3 ppm) | $2.00 \times 10^{-5}$ (0.71 ppm) | 0 (Not detected) |

EXAMPLE 9

The ion exchange capacities of compound $BiPbO2(N03)$ in NaCl solutions having various pH values, were measured. The ion exchange capacities were represented by the equivalent amounts (or meq) adsorbed or ion-exchanged per g of the ion exchanger, and the unit is g eqe $g^{-1}$ (g equivalent per g) or meqe $g^{-1}$ (mg equivalent per g).

About 97 mg of compound $BiPbO_2(NO_3)$ and 1 ml of a 0.2 mol $dm^{-3}$ NaCl solution were put in a container having a cover and sealed, and then reacted for 24 hours in a constant temperature vessel at a temperature of 25° C., 50° C. or 75° C. During the reaction, the container was shaked to stir the solution. After the reaction, the container was taken out, and the liquid and the solid were separated, whereupon the concentration of the chloride ions remaining in the solution was determined by ion chromatography, to obtain the ion exchange capacity. The pH of the solution was varied from 1 to 13, and for the adjustment of the pH, a nitric acid solution was used for the acidic side, and a sodium hydroxide solution was used for the alkaline side.

Figure 6:
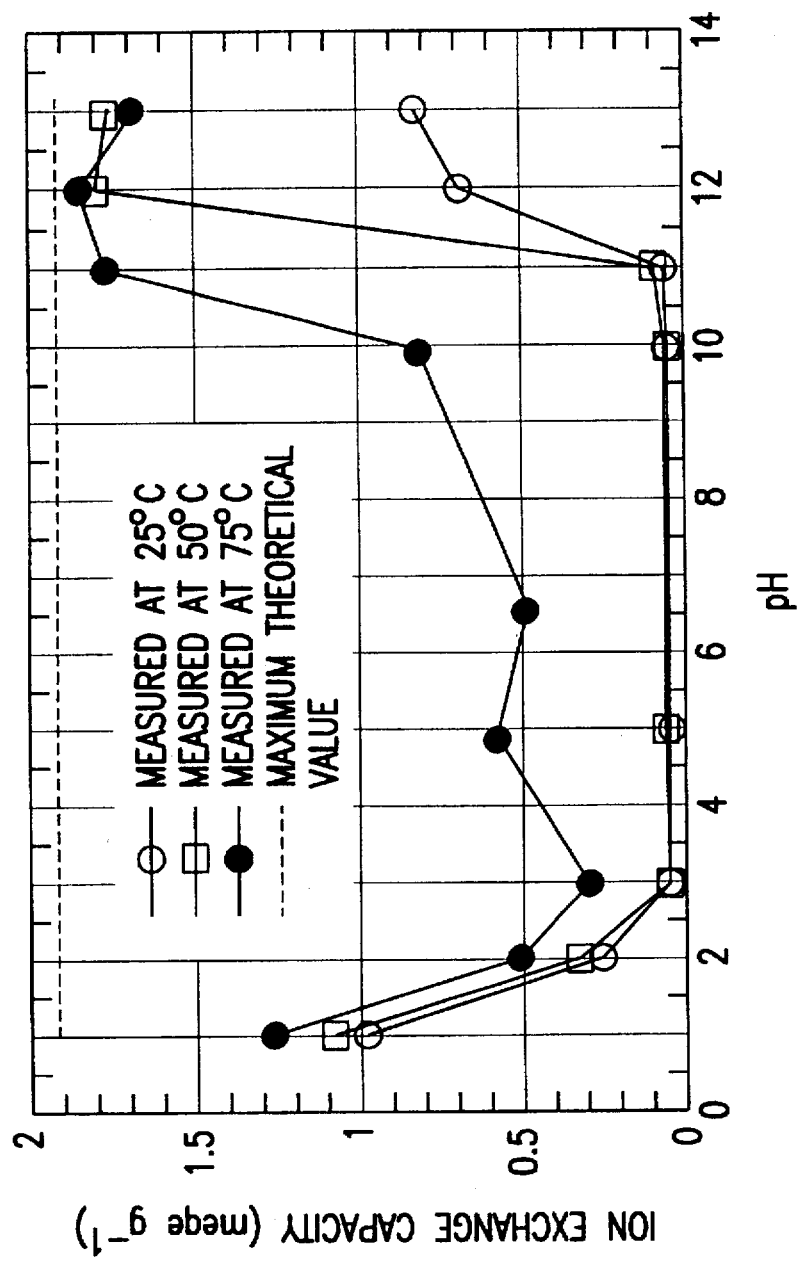
FIG. 6 is a graph showing the ion exchange capacities in solutions having various pH.

FIG. 6 of the attached drawings shows the relation between the pH of the aqueous solution and the ion exchange capacity for chloride ions as measured at 25° C., 50° C. or 75° C. The maximum theoretical value of the ion exchange capacity (1.96 meqe $g^{-1}$) shown in the Figure is the value of the ion exchange capacity calculated on the basis that $(NO_3)_-$ of $BiPbO_2(NO_3)$ was all converted to Cl–.

As is evident from this FIG. 6, the ion exchanger of this invention shows high ion exchange capacities in strongly acidic and strongly alkaline solutions by the reactions at 25° C., 50° C. and 75° C. Further, at a higher temperature i.e. 75° C., a high or finite ion exchange capacity is shown in each of the acidic, neutral and alkaline regions. In the reactions in the solutions of pH 12 and pH 13, the values of the ion exchange capacities measured at 50° C. and 75° C. are substantially equal to the maximum theoretical values, thus indicating that almost all $(NO_3)^-$ was converted to $Cl^-$, and the ion exchange efficiency was very high.

EXAMPLE 10

About 0.1 g (about $2\times10^{-4}$ g molecule) of $BiPbO_2(NO_3)$ and 1 ml of a 0.1 mol $dm^{-3}$ NaI solution (adjusted to pH 1 with a $HNO_3$ solution) ($I^-$: about $1\times10^{-4}$ g ion) were put into a container having a cover and reacted in a constant temperature vessel at 25° C. or 50° C. for various periods of time to examine the progress of the reaction. During the reaction, the container was shaked to stir the solution. Upon expiration of a predetermined time, the container was taken out, and the liquid and the solid were separated, whereupon the concentration of the iodide ions remaining in the solution was determined by ion chromatography.

Figure 7:
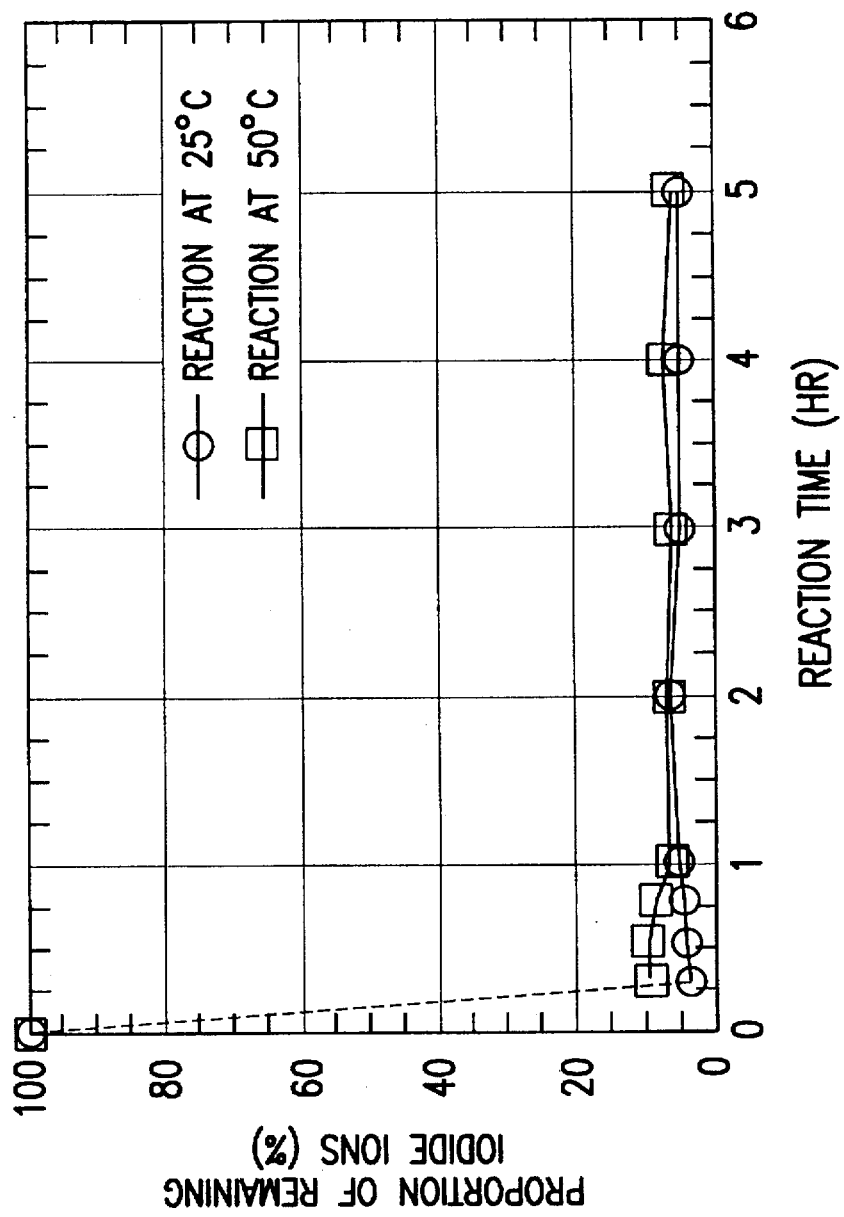
FIG. 7 is a graph showing the amount of iodide ions remaining in a solution of pH 1 at various times during the ion exchange reaction.

FIG. 7 of the attached drawings shows the relation between the reaction time and the proportion (%) of the remaining iodide ions. At any one of the temperatures, the reaction proceeded very quickly, and at least 90% of the iodide ions were removed in 15 minutes after the initiation of the reaction to reach substantially a constant value. The constant value was about 95% in the reaction at 25° C., and about 93% in the reaction at 50° C. The above results indicate that compound $BiPbO_2(NO_3)$ functions stably and effectively as an inorganic anion exchanger even in a strongly acidic solution (pH=1).

EXAMPLE 11

About 0.1 g (about $2\times10^{-4}$ g molecule) of $BiPbO_2(NO_3)$ and 1 ml of a 0.1 mol $dm^{-3}$ NaI solution (adjusted to pH 13 with a NaOH solution) ($I^-$: about $1\times10^{-4}$ g ion) were put into a container having a cover and reacted in a constant temperature vessel at 25° C. or 50° C. for various periods of time to examine the progress of the reaction. During the reaction, the container was shaked to stir the solution. Upon expiration of a predetermined time, the container was taken out, and the liquid and the solid were separated, whereupon the concentration of the iodide ions remaining in the solution was determined by ion chromatography.

Figure 8:
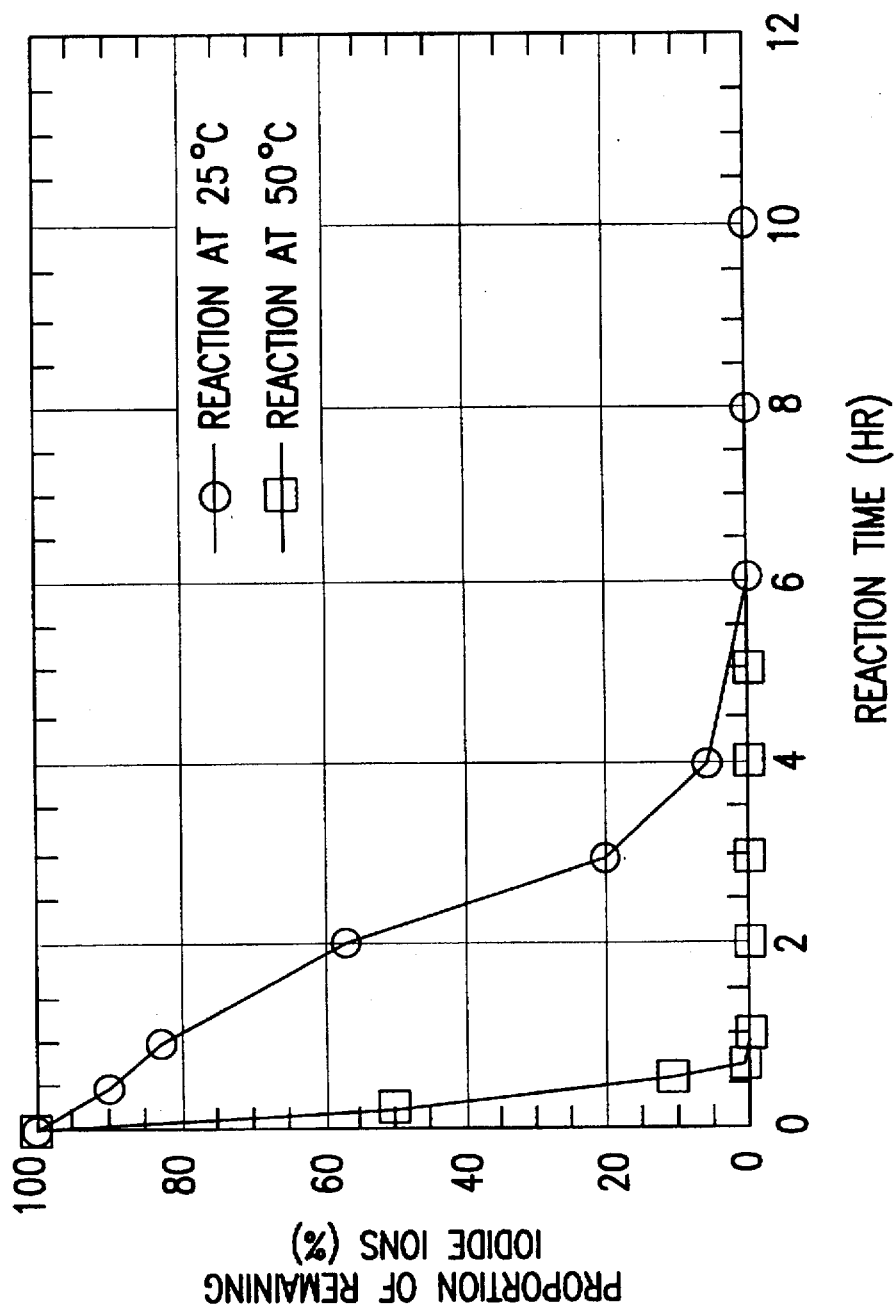
FIG. 8 is a graph showing the amount of iodide ions remaining in a solution of pH 13 at various times during the ion exchange reaction.

FIG. 8 of the attached drawings shows the relation between the reaction time and the proportion (%) of the remaining iodide ions. The reaction proceeded relatively quickly at 25° C. and completed in about 6 hours from the initiation of the reaction, whereby about 99.95% of the iodide ions were removed. At 50° C., the reaction proceeded very quickly, and about 99.1% of the iodide ions were removed in 45 minutes from the initiation of the reaction and about 99.97% of the iodide ions were removed in 2 hours from the initiation of the reaction. The above results indicate that compound $BiPbO_2(NO_3)$ function stably and effectively as an inorganic anion exchanger even in a strongly alkaline solution (pH=13).

EXAMPLE 12

About 2.0 g (about $4\times10^{-3}$ g molecule) of $BiPbO_2(NO_3)$ and 10 ml of a 0.05 mol $dm^{-3}$ NaI solution (adjusted to pH 1 or pH 13) ($I^-$: about $5\times10^{-4}$ g ion) or about 2.0 g (about $4\times10^{-3}$ g molecule) of $BiPbO_2(NO_3)$ and 10 ml of a 0.005 mol $dm^{-3}$ NaI solution (adjusted to pH 1 or pH 13) ($I^-$: $5\times10^{-5}$ g ion), were put into a container having a cover and sealed, and then reacted in a constant temperature vessel at 25° C. for 24 hours while stirring the container. In this Example, the proportion of the ion exchanger to the iodide ions is made larger than in Examples 6 and 7. Further, the concentration of the iodide ions was varied.

The results are shown in Table 7. As is evident from this Table 7, in either one of the solutions having pH 1 and pH 13, the iodide ions were effectively removed.

TABLE 7

| $I^-$ concentration before the reaction (mol $dm^{-3}$) | $I^-$ concentration after the reaction (mol $dm^{-3}$) | |
| --- | --- | --- |
| | Solution of pH 1 | Solution of pH 13 |
| $5 \times 10^{-2}$ (6345 ppm) | $6.537 \times 10^{-4}$ (82.95 ppm) | $1.590 \times 10^{-5}$ (2.02 ppm) |
| $5 \times 10^{-3}$ (634.5 ppm) | $0.881 \times 10^{-4}$ (11.17 ppm) | $2.85 \times 10^{-6}$ (0.36 ppm) |

EXAMPLE 13

In this Example, the ion exchange capacities of $BiPbO_2(NO_3)$ in NaI solutions having various pH values, were measured. The ion exchange capacity is represented by the equivalent amount (or meq) of ions adsorbed or ion-exchanged per g of the ion exchanger, and the unit is g eqe $g^{-1}$ (g equivalent per g) or meqe $g^{-1}$ (mg equivalent per g).

About 97 mg of $BiPbO_2(NO_3)$ and 1 ml of a 0.2 mol $dm^{-3}$ NaI solution were put into a container having a cover and sealed, and then reacted in a constant temperature vessel at 25° C., 50° C. or 75° C. for 24 hours. During the reaction, the container was shaked to stir the solution. After the reaction, the container was taken out, and the liquid and the solid were separated, whereupon the concentration of the iodide ions remaining in the solution was determined by ion chromatography, to obtain the ion exchange capacity. The pH of the solution was varied from 1 to 13. For the adjustment of the pH, a nitric acid solution was used for the acid side, and a sodium hydroxide solution was used for the alkaline side.

Figure 9:
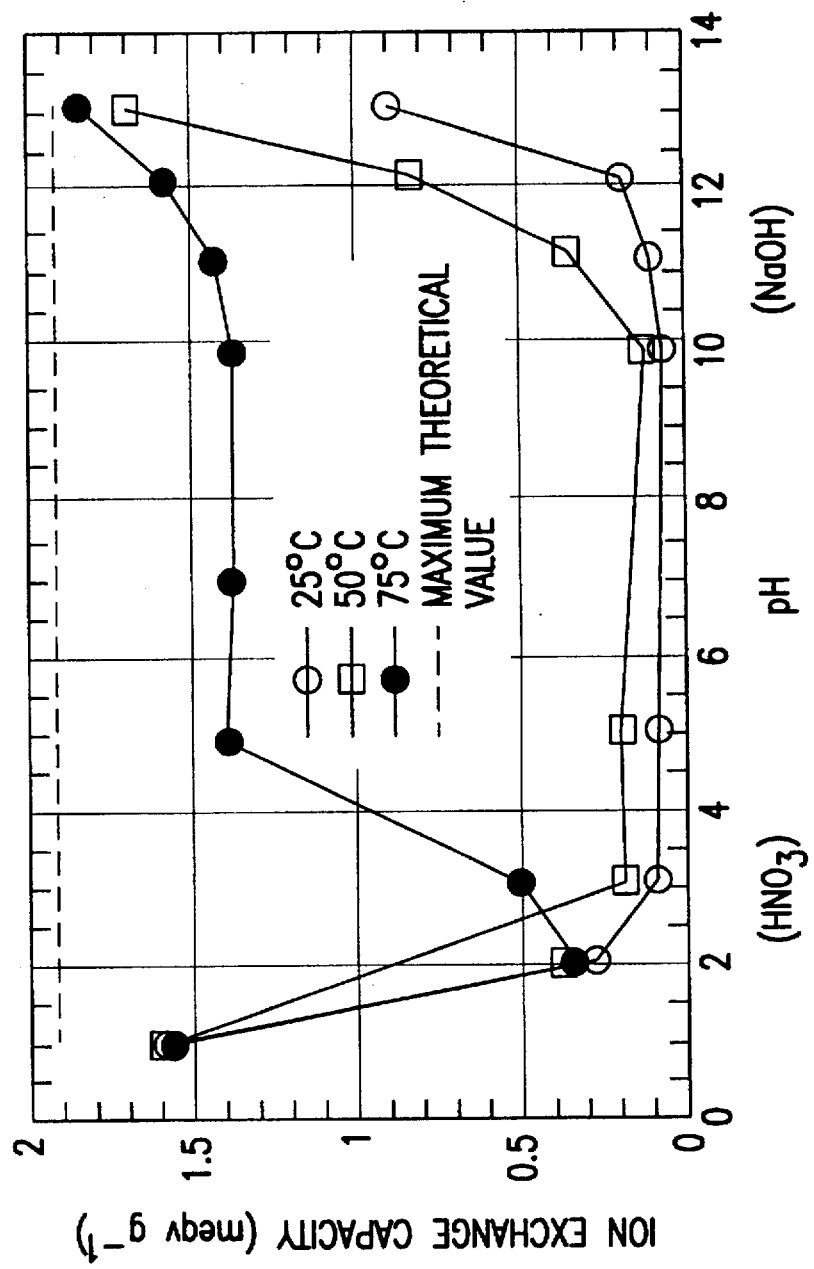
FIG. 9 is a graph showing ion exchange capacities in solutions having various pH.

FIG. 9 of the attached drawings shows the relation between the ion exchange capacity of the iodide ions measured at 25° C., 50° C. or 75° C. and the pH of the aqueous solution. The maximum theoretical value of the ion exchange capacity (1.96 meqe $g^{-1}$) shown in this FIG. 6 is the value of the ion exchange capacity calculated on the basis that $(NO_3)^-$ of $BiPbO_2(NO_3)$ was all converted to $I^-$.

As is evident from this FIG. 9, the ion exchanger of the present invention shows high ion exchange capacities in acidic and alkaline solutions by the reactions at 25° C. and 50° C. At a higher temperature i.e. 75° C., except for the case of pH=32 about 2, a high ion exchange capacity is shown in any one of the acidic, neutral and alkaline regions. The value was substantially equal to the maximum theoretical value, which indicates that almost all $(NO_3)^-$ was converted to $I^-$, and the ion exchange efficiency was very high.

As described in detail in the foregoing, the present invention presents a novel bismuth lead compound which has a large ion exchange capacity and a high ion exchange rate and is excellent in the acid resistance, the alkali resistance and the heat resistance and which is effective in any one of acidic, neutral and alkaline aqueous solutions, and an agent for fixing and removing inorganic anions including halide ions such as chloride ions or iodide ions, which contains the bismuth lead compound as an effective component.

What is claimed is:

1. A bismuth lead compound of the formula $BiPbO_2(N_3)$.
2. A method for producing the bismuth lead compound of claim 1, which comprises heating and reacting a starting material mixture prepared so that the molar ratio of a bismuth element, a lead element, an oxygen element and a nitrate group ($NO_3$) becomes about 1:1:2:1.
3. The method for producing a bismuth lead compound according to claim 2, wherein water is added to the starting material mixture, followed by the heating and reacting.

4. An inorganic anion exchanger containing a bismuth lead compound of the formula $BiPbO_2(NO_3)$ as the effective component.

5. A halide ion exchanger consisting essentially of the ion exchanger of claim 4.

6. The halide ion exchanger according to claim 5, wherein the halide ions are chloride ions or iodide ions.

7. A method for removing inorganic anions, which comprises removing inorganic anions by means of the compound of claim 1.

8. A method for removing inorganic anions, which comprises removing inorganic anions by means of the inorganic anion exchanger of claim 4.

9. The method for removing inorganic anions according to claim 7, wherein inorganic anions are halide ions.

10. The method for removing inorganic anions according to claim 8, wherein inorganic anions are halide ions.

11. The method for removing inorganic anions according to claim 7, wherein chloride ions or iodide ions are removed.

12. The method for removing inorganic anions according to claim 8, wherein chloride ions or iodide ions are removed.

13. The method for removing inorganic anions according to claim 9, wherein chloride ions or iodide ions are removed.

14. The method for removing inorganic anions according to claim 10, wherein chloride ions or iodide ions are removed.

* * * * *